(12) United States Patent
Lain et al.

(10) Patent No.: US 8,331,260 B2
(45) Date of Patent: Dec. 11, 2012

(54) SYMBOL DETECTION METHOD FOR MIMO SYSTEMS BASED ON PATH FINDING

(75) Inventors: Jenn-Kaie Lain, Yunlin County (TW);
Jyun-Yu Chen, Yunlin County (TW);
Po-Hui Yang, Yunlin County (TW)

(73) Assignee: National Yunlin University of Science and Technology, Douliu, Yunlin County (TW)

( * ) Notice: Subject to any disclaimer, the term of this patent is extended or adjusted under 35 U.S.C. 154(b) by 190 days.

(21) Appl. No.: 12/883,793

(22) Filed: Sep. 16, 2010

(65) Prior Publication Data
US 2012/0069769 A1 Mar. 22, 2012

(51) Int. Cl.
*H04J 1/16* (2006.01)
(52) U.S. Cl. .......................... 370/252; 370/254; 370/431
(58) Field of Classification Search .................. 370/252, 370/254–255, 276, 328, 431, 464–465
See application file for complete search history.

(56) References Cited

U.S. PATENT DOCUMENTS

| | | | | |
|---|---|---|---|---|
| 2007/0237152 A1* | 10/2007 | Zhu | ............................... | 370/392 |
| 2009/0221316 A1* | 9/2009 | Chuang et al. | ................. | 455/522 |
| 2011/0138255 A1* | 6/2011 | Lee | ............................... | 714/777 |
| 2011/0274186 A1* | 11/2011 | Lain et al. | ...................... | 375/260 |
| 2011/0293049 A1* | 12/2011 | Niewczas et al. | ............. | 375/344 |
| 2012/0036249 A1* | 2/2012 | Chandrasekaran | ........... | 709/224 |

OTHER PUBLICATIONS

Douik et al, optimised eigenstructure assignement by ANT system and LQR approaches, 2008, vol. 5, No. 4, pp. 45-56.*
Zhang et al, Reduced Complexity Schnorr-Euchner Decoding Algorithms for MIMO Systems,vol. 8, No. 5, May 2004, 3 pages.*
Kyungchum et al, ML Symbol Detection Based on the Shortest Path Algorithm for MIMO Systems, vol. 55, No. 11, Nov. 2007, 8 pages.*
Lewis et al, Optimising Efficiency and Gain of Small Meander Line RFID Antennas using ANT colony System, IEEE, 2009, pp. 1486-1492.*

* cited by examiner

*Primary Examiner* — Ayaz Sheikh
*Assistant Examiner* — Mounir Moutaouakil
(74) *Attorney, Agent, or Firm* — Muncy, Geissler, Olds & Lowe, PLLC

(57) ABSTRACT

A symbol detection method for an MIMO system based on path finding, which is a novel nonlinear signal detection algorithm called the MACO (Modified Ant Colony Optimization) algorithm in the present invention. The MACO algorithm is improved from the conventional ant colony optimization algorithm and applied to an MIMO (Multiple-Input Multiple-Output) system. The MIMO system increases the utility efficiency of spectrum but computational complexity of signal detection in the receiving terminals is suffered. The present invention simulates the foraging behavior of ants and pheromone to achieve superior performance and low computational complexity in signal detection of an MIMO system.

2 Claims, 4 Drawing Sheets

SYMBOL DETECTION METHOD FOR MIMO SYSTEMS BASED ON PATH FINDING

FIELD OF THE INVENTION

The present invention relates to a symbol detection method for a system, particularly to a symbol detection method for an MIMO system based on path finding.

BACKGROUND OF THE INVENTION

The MIMO (Multiple-Input Multiple-Output) system technology is a hot system technology to increase the utility efficiency of the spectrum with the minimum bandwidth in the wireless communication field. Signal detection of the receiving terminal is a critical task in an MIMO system. Accurate signal detection can effectively improve the error rate of bits in the system, reliability and frequency spectrum efficiency of the system also can be increased.

The ML (Maximum Likelihood) algorithm is the best signal-detection estimation method, wherein an exhaustive search method is used to compare the distances between all the possible signals sent out by the sending terminal and the signals received by the receiving terminal to find out a pair of signals having the shortest distance to the receiving terminal to be functioned as the final decision signal. However, the ML algorithm is too complicated to have rational computation cost and popular commercial application.

There have been many papers proposing algorithm to reduce the computational complexity of an MIMO system, including linear detection algorithm and nonlinear detection algorithm. However, the computational complexity is reduced but the error rate performance is suffered. In the linear detection algorithm, such as the ZF (zero forcing) algorithm and the MMSE (Minimum Mean Square Error) algorithm have lower computational complexity but higher performance loss. The nonlinear detection algorithm includes the V-BLAST (Vertical Bell Laboratories Layered Space Time) algorithm and the SD (Sphere Decoding) algorithm which has been introduced in many papers in recent years. The SD algorithm can achieve the performance of the ML algorithm and has been realized in many VLSI (Very Large Scale Integrated) circuits. However, the SD algorithm still has complexity higher than the V-BLAST algorithm.

Refer to Table. 1 to compare the complexity and performance of the conventional signal-detection algorithm. The algorithm having lower complexity usually has worse performance, and the algorithm having better performance usually has higher complexity.

TABLE 1

The comparison sheet of the conventional signal-detection algorithm

| Algorithm | Complexity | Performance |
| --- | --- | --- |
| Zero Forcing algorithm | low | worst |
| Minimum Mean Square Error algorithm | low | good |
| Vertical Bell Laboratories Layered Space Time algorithm | low | good |
| Maximum Likelihood algorithm | high | best |
| Sphere Decoding algorithm | varies according to signal to noise ratio | best |

SUMMARY OF THE INVENTION

The primary objective of the present invention is to solve the computational problem of the MIMO system in the communication field.

Another objective of the present invention is to solve the problem of high error-rate performance needs high complexity calculation, and low complexity calculation reduces error-rate performance.

A further objective of the present invention is to solve the problem of the conventional ant algorithm is likely to have error propagation and local solution. When the conventional ant algorithm is directly applied to an MIMO network system, the error of computation to distance occurs due to hard decision. Moreover, if the error of computation to distance is transformed into heuristic value and ant mobility, the error propagation will decrease the error-rate performance. A higher heuristic vale usually increases the ant mobility. However, the ant only walks along a single route, and the equation converging to a local solution is not the solution that we desired.

To achieve the abovementioned objectives, the present invention proposes a symbol detection method for an MIMO system based on path finding, wherein the MIMO system is arranged behind a plurality of sending terminals to receive and analyze the baseband signals from the sending terminals. The invention uses a unique solution of an ant algorithm to perform complicated computation of an MIMO system and improves to be an MACO (Modified Ant Colony Optimization) algorithm. The MACO algorithm uses non-identical ant tracks to solve the problem of signal detection caused by the original ACO algorithm applied to the MIMO system. In other words, different ants have different distances, heuristic values and mobility while finding solutions. As the ants have different tracks, the pheromone factor can be omitted without consideration and the pheromone factor in the original ant mobility equation can be removed.

Via the MACO algorithm, the present invention can achieve the best error-rate performance that the conventional technology can achieve, and has low computational complexity. The present invention can comprise the computational complexity and the error-rate performance via regulating the count of ants. If the system requires lower computational complexity, the count of the ants is decreased. If the system requires higher error-rate performance, the count of the ants is increased. In the present invention, the computational complexity is not influenced by the quality of the communication environment. In other words, the computational complexity is not influenced by SNR (Signal to Noise Ratio). Further, the MACO algorithm of the present invention can be designed to be a parallel algorithm, wherein the solutions are not searched serially but are searched by many ants simultaneously.

DETAILED DESCRIPTION OF THE PREFERRED EMBODIMENTS

Below, the technical contents of the present invention are described in detail in cooperation with the drawings.

Figure 1:
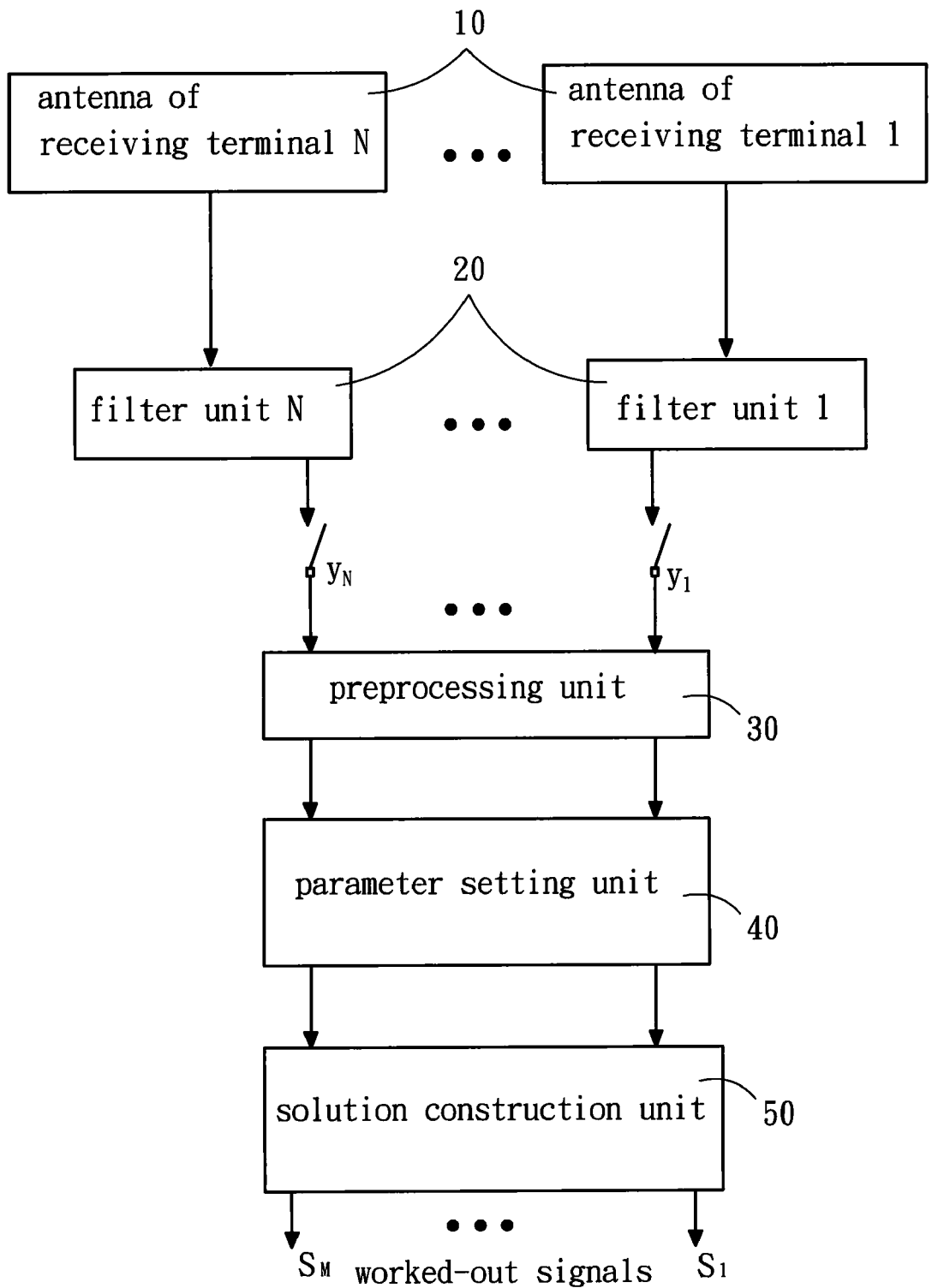
FIG. 1 is a block diagram schematically showing one embodiment of the present invention.

Refer to FIG. 1 a block diagram schematically showing one embodiment of the present invention. The present invention proposes a symbol detection method for an MIMO system based on path finding, wherein the MIMO system is arranged behind a plurality of sending terminals to receive and analyze the baseband signals from the sending terminals. The method of the present invention comprises the following steps:

S1: Signal Filtering: the baseband signals are detected by antennae 10 of a plurality of receiving terminals, and filtered by filter units 20 matching the sending terminals to select a required band, wherein the number of the filter units 20 corresponds to the number of the antennae 10 of the receiving terminals.

S2: Preprocessing: the required band is preprocessed by a preprocessing unit 30 and then undertaken a signal detection of the MACO algorithm. In this embodiment, the preprocessing is QR decomposition. The QR decomposition transforms a matrix into a product of an upper triangular matrix R and an orthogonal matrix Q.

S3: Parameter Setting: the parameters of the MACO algorithm are set by a parameter setting unit 40. In this embodiment, the parameters include an input amount (i), an output amount (j), a number of ants (k) and a heuristic value ($\eta_{ij}$). As the pheromone factor is omitted in the MACO algorithm, the pheromone value ($\tau_{ij}$) needn't be set.

S4: Calculation: the parameters in the parameter setting unit 40 are input to a solution construction unit 50 to calculate the solutions of the signals according to Equation (a):

$$P_{ij}^k = \frac{[\eta_{ij}^k]^\beta}{\sum_{u \in M_c}[\eta_{iu}^k]^\beta} \quad (a)$$

Equation (a) is used to estimate the probability that an ant walks along a path. The k ants respectively find an appropriate path to walk based on the ant mobility (i.e. the partial solutions). In this stage, the k ants will complete the path selecting actions until k solutions are generated.

S5: Parameter Updating: the parameters calculated by the path probability are sent back to the parameter setting unit 40 to update the parameters, wherein the heuristic value ($\eta_{ij}$) is updated according to Equations (b) and (c):

$$d_{ij}^k = \left| y_i - \sum_{l=i+1}^{M} r_{il} \cdot S_l^k - r_{ii} \cdot S_j \right| \quad (b)$$

$$\eta_{ij}^k = \frac{1}{1 + \exp(d_{ij}^k)} \quad (c)$$

wherein Equation (b) is used to calculate the path distance and Equation (c) is used to calculate the heuristic value ($\eta_{ij}$).

S6: Completing Signal Solution Calculation.

It should be mentioned particularly that the kth ant is in the Mth dimension at the beginning. As the kth ant is in the highest dimension, the kth ant calculates the distances of the Mc nodes in the Mth dimension according to Equation (b) without using the summation term in Equation (b). Then, Equations (c) and (a) are used to convert the distances into the heuristic value and the ant mobility. Once the ant mobility is worked out, the kth ant selects one of the paths. Thus is generated a partial solution.

After the kth ant has selected a path in the Mth dimension, the kth ant moves to the (M−1)th dimension. At this time, Equation (b) is used to calculate the distance in the (M−1)th dimension via substituting the worked-out values into the summation term in Equation (b). After the distances in the (M−1)th dimension are worked out, the distances are also converted into the heuristic value and the ant mobility. Then, the solutions of the (M−1)th dimension are obtained according to the ant mobility. The above-mentioned processes are repeated until the kth ant has finished its walk in the first dimension.

Once the kth ant has finished its walk in the first dimension, a set of solutions is generated. Then, the set of solutions is substituted into Equation (d) to estimate the quality of the path that the kth ant walked (the Euclidean distance). Equation (d) is expressed by:

$$\phi_k = \|y - Hs_k\|^2 \quad (d)$$

The distance of the optimal solution is compared with the distance of the path that the kth ant walked. If the distance of the path that the kth ant walked is shorter than that of the optimal solution, the path that the kth ant walked replaces the optimal solution. The abovementioned processes are repeated until m ants have finished the actions of finding solutions. The error rate of the solution with the shortest path is compared with the error rate of the original signal to obtain an optimal solution.

Figure 2:
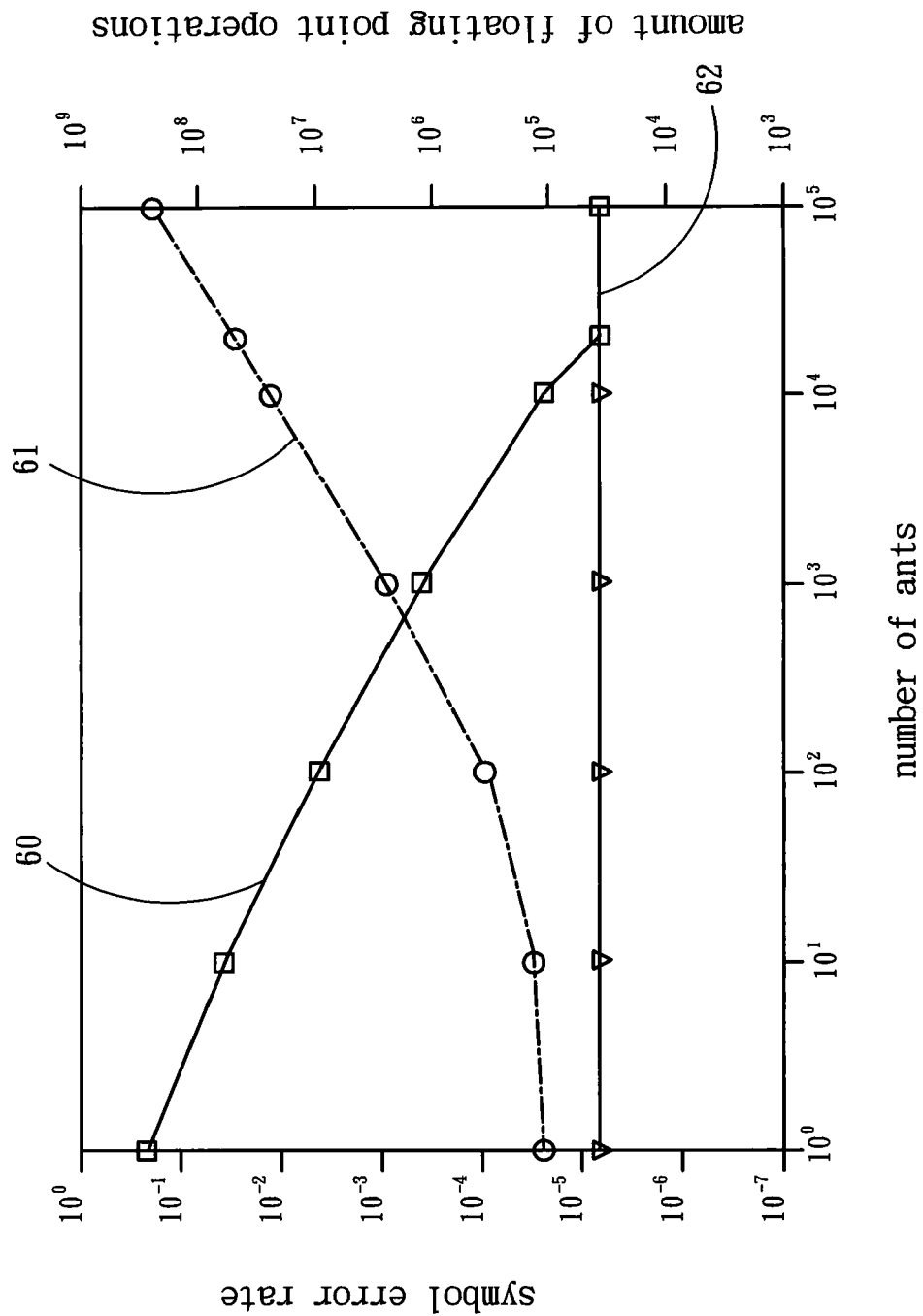
FIG. 2 is a diagram showing the relationship between the performance and the computational complexity according to one embodiment of the present invention.

Refer to FIG. 2 a diagram showing the relationship between the performance and the computational complexity. The computational complexity is determined by setting the number of ants. In FIG. 2, it is known that the performance line 60 descends with the increase of the number of the ants. From the floating point operation line 61, it is known that the increase of the number of the ants raises the computational complexity. In this embodiment, Schnorr-Euchner proposes an SD-like algorithm called the SE-SD algorithm, whose performance (shown by the SE-SD performance line 62) can approach that of the ML algorithm. Therefore, the SE-SD algorithm is used as the standard of comparison. When the performance line 60 achieves the same SER (Symbol Error Rate) as the SE-SD performance line 62, the present invention achieves the optimal performance. At this time, the number of the ants is 20000. Therefore, the number of the ants is set at 20000 in this embodiment of the present invention to be compared with other algorithm.

Figure 3:
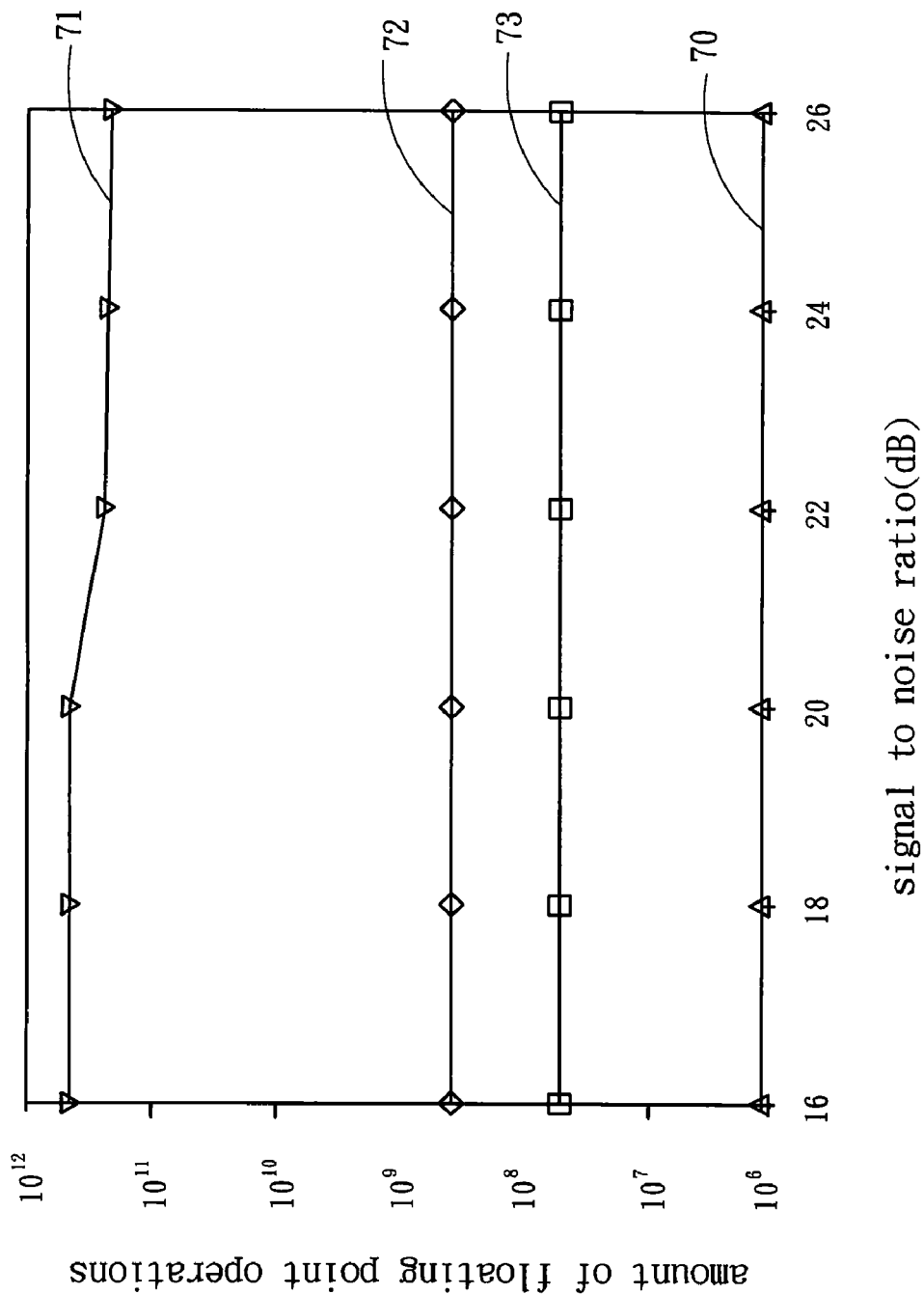
FIG. 3 is a diagram showing the amount of the floating point operations according to one embodiment of the present invention.
Figure 4:
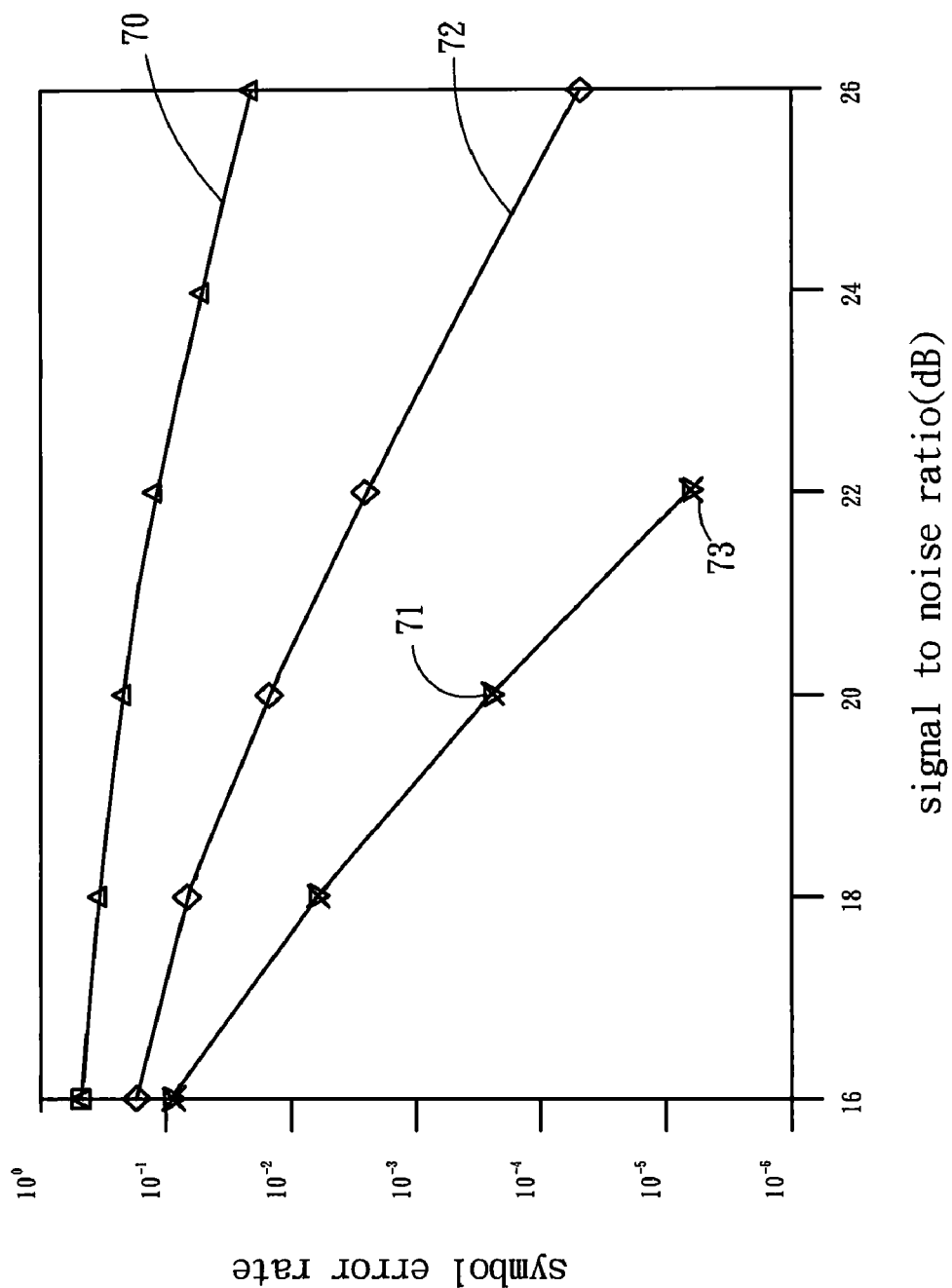
FIG. 4 is a diagram showing the simulation results according to one embodiment of the present invention.

Refer to FIG. 3 and FIG. 4. FIG. 3 is a diagram showing the amount of the floating point operations according to one embodiment of the present invention. FIG. 4 is a diagram showing the simulation results according to one embodiment of the present invention. The conventional technologies used in comparison include the V-BLAST algorithm (denoted by 70), the SE-SD algorithm (denoted by 71), and the SDR (Semi-Definite Relaxation) algorithm (denoted by 72). The SDR algorithm was introduced in a paper "MIMO Detection of 16-QAM Signaling Based on Semidefinite Relaxation" by Y. Yijin, Z. Chunming, Z. Peng and X. Wei in IEEE Signal Process. Lett., vol. 14, no. 11, pp. 797-800, November 2007. In FIG. 3, it is known that the amount of the floating point operations of the MACO algorithm 73 is only greater than that of the V-BLAST algorithm 70 but lower than that of the SE-SD algorithm 71 and that of the SDR algorithm 72. It means that the computational complexity of the present invention is only higher than that of the V-BLAST algorithm 70. In FIG. 4, it is known that the SER of the MACO algorithm 73 of the present invention is as good as that of the SE-SD algorithm 71 at the same SNR. As the V-BLAST algorithm 70 has lower complexity, it has poor simulation results. The complexity of the SE-SD algorithm 71 is about $10^4$ times than that of the present invention. However, the simulation results show that the present invention can achieve the same error detection performance as the SE-SD algorithm 71. Compared with the SDR algorithm 72, the present invention not only has lower complexity but also has better error detection ability.

In conclusion, the present invention utilizes the MACO algorithm 73 to achieve the best error-rate performance that the conventional technologies can achieve and lower computational complexity. The present invention regulates the number of the ants to compromise the computational complexity and the error-rate performance. If the system requires lower computational complexity, the number of the ants is decreased. If the system requires higher error-rate performance, the number of the ants is increased. In the present invention, the computational complexity is not influenced by the quality of the communication environment. In other words, the computational complexity is not influenced by SNR (Signal to Noise Ratio). Further, the MACO algorithm of the present invention can be designed to be a parallel algorithm to reduce the computation time, wherein the solutions are not serially searched but are searched by many ants simultaneously.

What is claimed is:

1. A symbol detection method for an MIMO (Multiple-Input Multiple-Output) system based on path finding, wherein the MIMO system is arranged behind a plurality of sending terminals to receive and analyze baseband signals from the sending terminals, the symbol detection method comprises steps of:

S1: signal filtering, wherein the baseband signals are detected and then filtered by filter units matching the sending terminals to select a required band;

S2: preprocessing, wherein the required band is preprocessed through a preprocessing unit and then undertaken a signal detection of an MACO (Modified Ant Colony Optimization) algorithm;

S3: parameter setting, wherein parameters of the MACO algorithm are set in a parameter setting unit, and wherein the parameters include an input amount (i), an output amount (j), a number of ants (k), and a heuristic value $(\eta_{ij})$;

S4: calculation, wherein the parameters in the parameter setting unit are input to a solution construction unit to calculate solutions of signals according to the following equation:

$$P_{ij}^k = \frac{[\eta_{ij}^k]^\beta}{\sum_{u \in M_c} [\eta_{iu}^k]^\beta};$$

S5: parameter updating, wherein the parameters calculated by path probability are sent back to the parameter setting unit to update the parameters; and S6: completing signal solution calculation.

2. The symbol detection method for an MIMO system based on path finding according to claim 1, wherein the preprocessing is QR decomposition, and wherein the QR decomposition transforms a matrix into a product of an upper triangular matrix R and an orthogonal matrix Q.

* * * * *